(12) United States Patent
Pultorak

(10) Patent No.: US 9,036,222 B2
(45) Date of Patent: *May 19, 2015

(54) DOCUMENT SCANNER

(75) Inventor: David M. Pultorak, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 532 days.

This patent is subject to a terminal disclaimer.

(21) Appl. No.: 13/272,616

(22) Filed: Oct. 13, 2011

(65) Prior Publication Data

US 2013/0094067 A1    Apr. 18, 2013

(51) Int. Cl.
*H04N 1/04*     (2006.01)
*H04N 1/32*     (2006.01)
*H04N 1/40*     (2006.01)
*H04N 1/00*     (2006.01)

(52) U.S. Cl.
CPC ....... *H04N 1/00588* (2013.01); *H04N 1/00591* (2013.01); *H04N 1/00602* (2013.01); *H04N 1/0062* (2013.01); *H04N 1/00631* (2013.01); *H04N 1/00702* (2013.01); *H04N 1/0071* (2013.01); *H04N 1/00713* (2013.01); *H04N 1/00734* (2013.01); *H04N 1/00771* (2013.01); *H04N 1/00774* (2013.01); *H04N 1/00777* (2013.01); *H04N 2201/0098* (2013.01)

(58) Field of Classification Search
CPC ....... H04N 1/193; H04N 1/17; H04N 1/0402; H04N 1/1013; H04N 1/12; H04N 1/00681; H04N 2201/00766; H04N 2201/00756; H04N 1/1017; H04N 1/0057; H04N 1/121; H04N 2201/00631; H04N 2201/00619

USPC ........ 358/488, 486, 496, 498, 448, 468, 1.12, 358/1.18, 1.19; 382/312, 318, 319
See application file for complete search history.

(56) References Cited

U.S. PATENT DOCUMENTS

| | | | |
|---|---|---|---|
| 6,370,277 | B1 | 4/2002 | Borrey |
| 6,520,498 | B2 | 2/2003 | Phinney |
| 6,913,259 | B2 | 7/2005 | Phinney |
| 7,336,404 | B2 * | 2/2008 | Benham ........................ 358/488 |
| 2002/0054335 | A1 | 5/2002 | Sekiguchi |
| 2005/0030597 | A1 | 2/2005 | Benham |
| 2010/0328734 | A1 | 12/2010 | Okada |
| 2011/0279849 | A1 | 11/2011 | Umi |
| 2011/0292434 | A1 | 12/2011 | Lim |
| 2012/0019841 | A1 * | 1/2012 | Schaertel et al. .............. 358/1.9 |

(Continued)

FOREIGN PATENT DOCUMENTS

| | | |
|---|---|---|
| EP | 0 711 062 | 5/1996 |
| EP | 0 766 449 | 4/1997 |
| EP | 1 311 106 A1 | 10/2002 |
| JP | 2010 157916 | 7/2010 |
| WO | 2011/064229 | 6/2011 |

*Primary Examiner* — Cheukfan Lee
(74) *Attorney, Agent, or Firm* — Hogan Lovells US LLP

(57) ABSTRACT

A document scanner (10) includes an input tray (20) for holding documents (11). An input image capture device (30) captures at least a portion of the images of documents in the input tray. An image processor (65) determines characteristics of documents in the input tray, and the documents are processed based on the characteristics. At least one characteristic is document length (70), or width (80), or position (170), or other characteristics. An ultrasonic zone (160) detects the documents; and the ultrasonic zones are enabled or disabled in at least one location down the document based on at least one characteristic.

7 Claims, 3 Drawing Sheets

(56) References Cited

U.S. PATENT DOCUMENTS

| | | | |
|---|---|---|---|
| 2012/0019874 A1* | 1/2012 | Schaertel et al. | 358/474 |
| 2012/0044547 A1* | 2/2012 | Schaertel et al. | 358/498 |
| 2012/0044548 A1* | 2/2012 | Schaertel et al. | 358/498 |
| 2013/0063747 A1* | 3/2013 | Sugimura | 358/1.13 |
| 2013/0094065 A1* | 4/2013 | Pultorak | 358/443 |
| 2013/0135687 A1* | 5/2013 | Link et al. | 358/448 |
| 2013/0135688 A1* | 5/2013 | Link et al. | 358/449 |
| 2013/0155448 A1* | 6/2013 | Link et al. | 358/1.15 |

* cited by examiner

DOCUMENT SCANNER

CROSS REFERENCE TO RELATED APPLICATIONS

Reference is made to commonly-assigned copending U.S. patent application Ser. No. 13/272,599, filed Oct. 13, 2011, entitled DETERMINING DOCUMENT CHARACTERISTICS PRIOR TO SCANNING, by Pultorak; U.S. patent application Ser. No. 12/839,476, filed Jul. 20, 2010, entitled METHOD FOR DOCUMENT SCANNING, by Schaertel et al.; and U.S. patent application Ser. No. 12/839,471, filed Jul. 20, 2010, entitled A DOCUMENT SCANNER, by Schaertel et al.; the disclosures of which are incorporated herein.

FIELD OF THE INVENTION

This invention relates to extracting properties of the document fed to a scanner from an input tray, before the document passes scanning cameras on a transport path.

BACKGROUND OF THE INVENTION

A document scanner moves a document through a transport path and creates an image of the document as it moves. The processor memory for the document scanner must have preset document characteristics and the operator must select functions and features to accommodate the specific requirements for a particular document. Alternately, the scanner may default to less efficient settings that will process all documents since scanners are not typically programmed with specific requirements on a document-by-document basis.

The preset characteristics, features, and functions are a product of document characteristics, such as size, weight, texture, and specific application requirements such as resolution, and imaging mode; for example color, simplex, or duplex. In a document scanner, the documents to be scanned may vary by size, weight, color content, physical condition, or other characteristics, which may require different scanner features to be enabled or operator actions to be employed for the most optimal and efficient mode of operation. Prior knowledge of these many different document attributes can enable the proper selection of scanner features to improve the efficiency of the scanning process or enable other features which may provide specific applications required by a particular type, style, or size of document.

Prior knowledge of the documents physical condition can also prompt immediate action from the operator to protect the document or scanner or allow other features within the scanner to perform more reliably. There is a need, therefore, for detection of document characteristics prior to the document entering the transport path.

SUMMARY OF THE INVENTION

Briefly, according to one aspect of the present invention A document scanner includes an input tray for holding documents. An input image capture device captures at least a portion of the images of documents in the input tray. An image processor determines characteristics of documents in the input tray, and the documents are processed based on the characteristics. At least one characteristic is document length, or width, or position, or other characteristics. Ultrasonic zone detects the documents; and the ultrasonic zones are enabled or disabled in at least one location down the document based on at least one characteristic.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
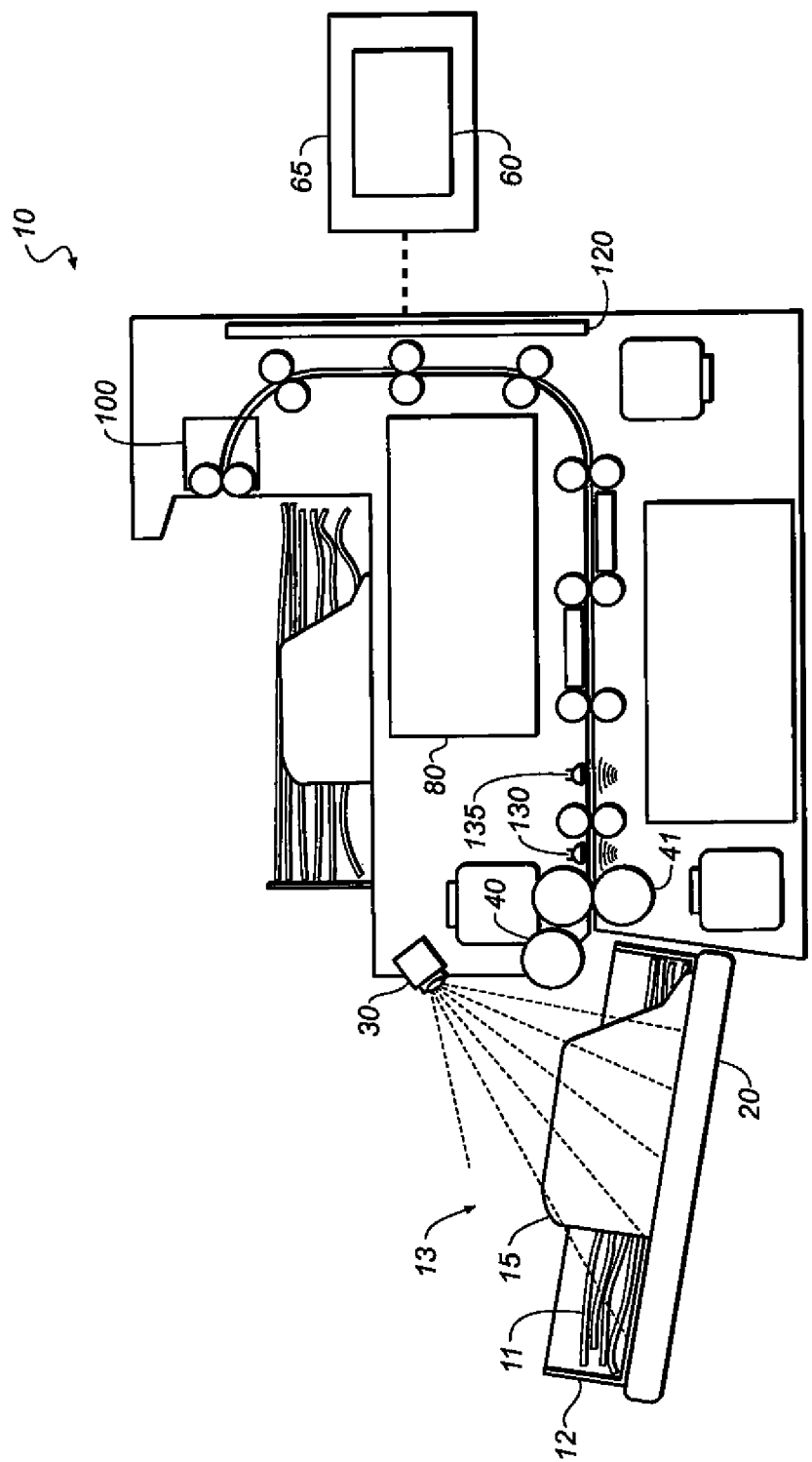
FIG. 1 is a cross-section view from the side of a document scanner which illustrates the various parts of the scanner related to the present invention.

FIG. 1 is a side cross-sectional view of a document scanner 10. The illustration shows the input tray 20 and input tray camera or image capture device 30. A typical scanner also has a transport mechanism for moving documents through the scanner and an output tray for collecting documents as well as other components that makeup a document scanner.

As shown in FIG. 1, documents 11 are first placed in the input tray 20 of the scanner. Imaging capture device 30 captures an image of the top document on the stack of documents 11. The document image is captured both statically and dynamically as it begins to move forward into the scanner by the feed roller 40 and separation roller 41. As frames of image data are captured, they are transmitted to be processed by an image processor shown schematically as image processing block 60.

The image processing block 60 processes the image data, to determine document characteristics such as document content, document condition, the desired information to be extracted and saved from the document. These characteristics will enable a particular feature or operation of the scanner based on the document content or condition. The document is processed based on the document characteristics.

Figure 2:
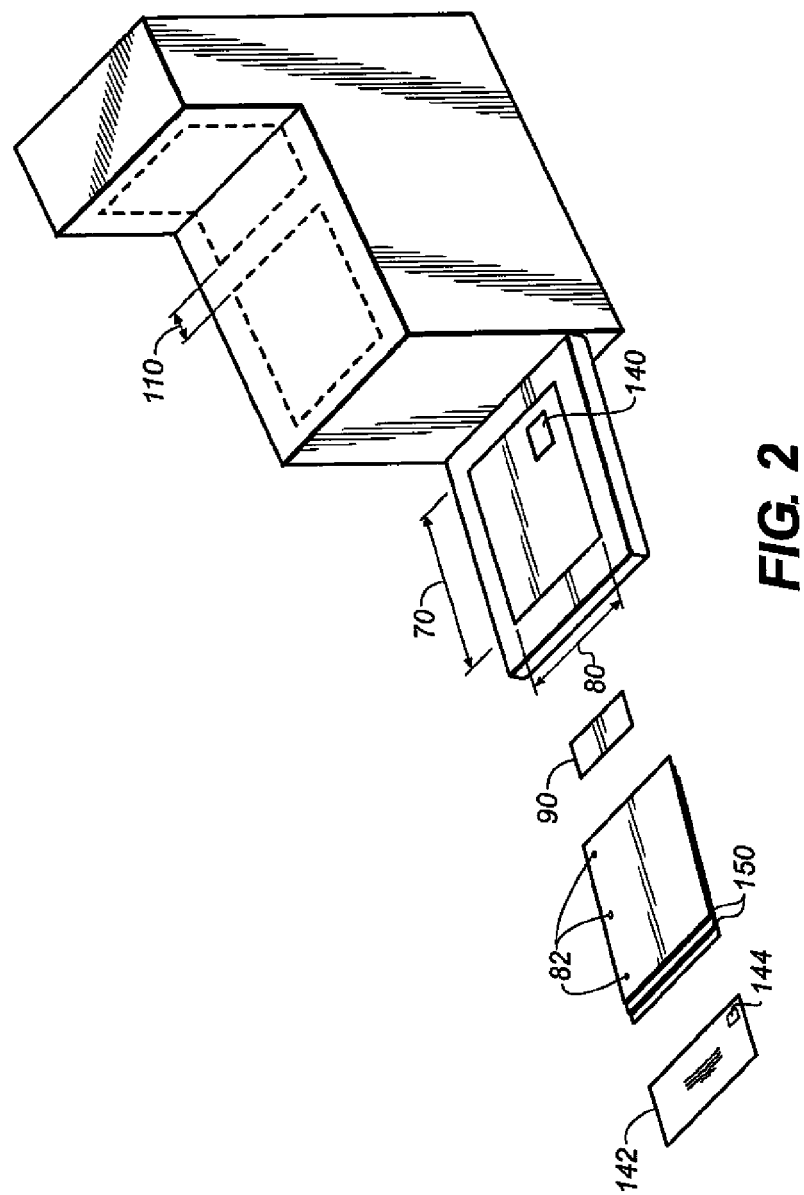
FIG. 2 is a perspective view of the scanner and illustrates various types of documents.

Some of the document characteristics that are important in processing the document is the document length 70 or width 80 shown in FIG. 2. If a short document is detected the master image buffer (not shown) size is reduced. If a short document is detected the feed roller 40 may also be stopped to prevent jams. For a longer document, the feed roller continues to run which will reduce feed roller wear.

Figure 3:
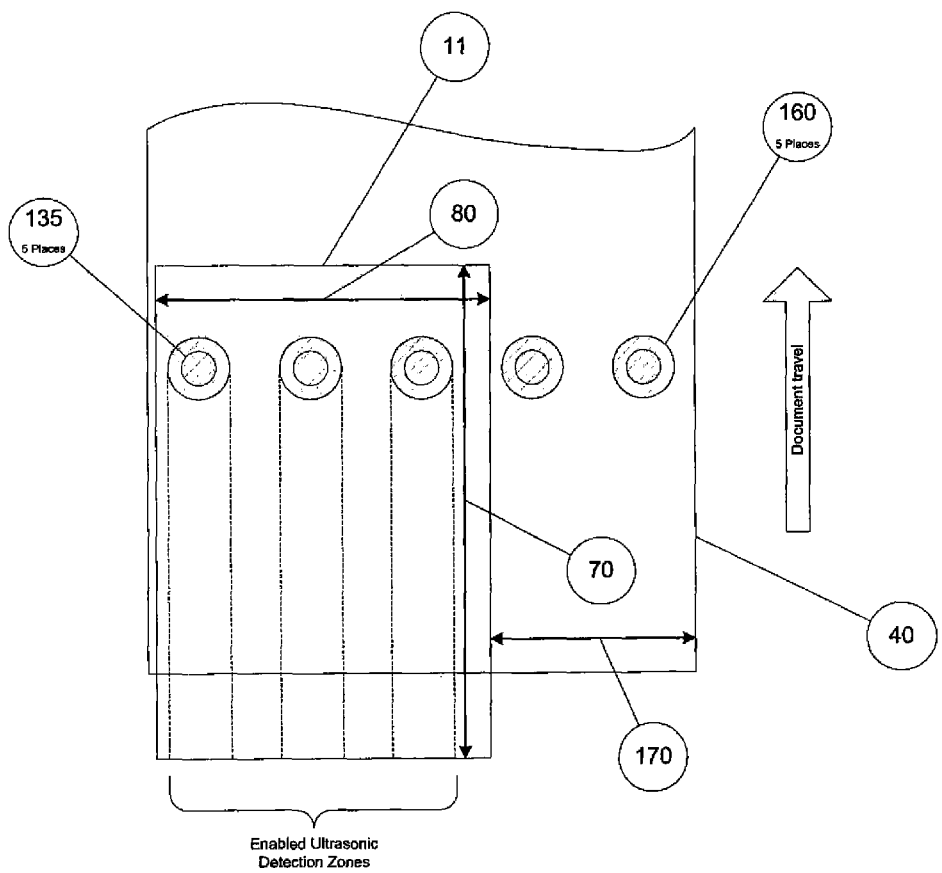
FIG. 3 is a top schematic view of a documents width, length and position in a transport relative to sensing zones as the document travels through the transport.

An important feature related to document length 70, width 80, and position 170 as shown in FIG. 3, is the enabling and disabling of individual ultrasonic sensing zones 160, which can be found in a document scanner. If the document 11 is of a size or position in the input tray 20 such that the edge of the document may cause a false multiple detection by crossing over a portion of an ultrasonic sensing zone 160, the ultrasonic sensing zone 160 can be disabled for that particular document 11 and re enabled for the next document without the intervention of an operator. Also if the length 70, width 80, and position 170 of the document 11 are known, all the ultrasonic sensing zones 160 can be enabled such that any zone that is sufficiently covered will detect a potential multiple document. An image of the document length 70, width 80, and position 170 can be determined by use of an imaging capture device 30 or other sensing apparatus. Once the edges of a document 11 have been detected by an imaging capture device 30, or other sensing apparatus, this information can then be transmitted to a processor 65 to determine the length 70, width 80, and position 170 of that document 11 in the input tray 20.

Another scanner feature related to length and width includes sorting the document on exit from the scanner. For example, if the document is a check 90. The document may also be checked for compatibility with the scanner. Controlled output stacking 100 shown in FIG. 1 may be adjusted for higher throughput, or a document gap 110 may be adjusted according to document length.

An important document characteristic is orientation. Detection of the document orientation as portrait or landscape, relative to the direction of document travel, will be used to improve the performance of the auto orientation feature. Using document width or location of the document in the input tray 20, is used to improve the document locate function.

Color or lack thereof within a document will be determined to set the appropriate color mode for image capture. The document configuration may also be detected, for example, if a document has stick on labels 140 applied to them or if the document is an envelope 142. The ultrasonic detection 135 can tell where in the document to ignore the signal during the time the sticky label is passing through the ultrasonic sensing zones 160 or turn off the sensing zones 160 for an envelope. Stick on labels 140 are detected based on color. The results are used to disable ultrasonic sensing in the area of the label.

Content within the document will be used for line or form detection. This enables the processor 65 to determine whether to capture the image or not and what processing may be required for the image data if captured. Patches and barcodes will be detected and read for the processor to take the appropriate action. Detection of postage stamps 144 or envelopes 142 is used by the processor to adjust scanner operation.

Document content is processed using optical character recognition (OCR) to detect a predetermined word, detect and interpret magnetic character ink, photographs, text or graphics. The processor then modifies scanner functions, for example, disabling automatic orientation when no text is present. Money may also be detected and counted.

Document content is also used to detect checks 90 and document resolution. The processor uses this information to adjust scanner functions such as setting the image capture mode.

A document characteristic useful for scanner processing is a folded corner or torn portion of the document. If those defects are detected the transport will be stopped and the operator will be alerted to this condition. Holes 82 in the document will be detected by the input image capture device 30 and ignored by the machine control function 120 of the scanner. Wrinkles in the document, if detected, causes processor to optimized parameters for sonic 130 or ultrasonic 135 detection. Another detectable characteristic is a staple, paperclip, or rubber band on the document. When detected the processor stops the transport and the operator is alerted of the condition. Tape located on a document may be detected and is a possible indication of a fraudulent document.

Imaging of the input tray 20 area detects the presence of documents 11 or a batch box 12. Once documents are detected, the number of documents can be determined. The absence of documents in the input tray will be detected. Orientation or location of the documents detected indicates document skew and location. This information enhances the performance of automatic orientation. The transport may be stopped and the operator altered to conditions that adversely affect operation of the scanner.

Imaging of the documents 11 will be used to detect dual shadows 150 which may indicate a multi-feed. No movement of the documents may indicate a misfeed.

Imaging of the input area 13 and processing of the image data will determine characteristics of the input area whereby side guide 15 location can be determined. Correct side guide location will be determined with regard to the documents 11 in the input tray 20.

The invention has been described in detail with particular reference to certain preferred embodiments thereof, but it will be understood that variations and modifications can be effected within the scope of the invention.

PARTS LIST 10 scanner
11 documents
12 batch box
13 input area
15 side guide
20 input tray
30 imaging capture device
40 feed roller
41 separation roller
60 image processing block
65 processor
70 document length
80 document width
82 holes
90 check
100 controlled output stacking
110 document gap
120 machine control function
130 sonic detection
135 ultrasonic detection
140 stick on label
142 envelope
144 postage stamp
150 dual shadows
160 ultrasonic sensing zones
170 position

The invention claimed is:

1. A document scanner comprising:
   an input tray for holding documents;
   an input image capture device for capturing at least a portion of images of documents in the input tray;
   an image processor for determining characteristics of documents in the input tray;
   wherein said documents are processed based on said characteristics;
   wherein at least one characteristic is related to document condition or content;
   ultrasonic zones for detecting the documents; and
   wherein the ultrasonic zones are enabled or disabled in at least one location down the document based on the at least one characteristic.

2. The document scanner as in claim 1 wherein a master image buffer is reduced for short documents.

3. The document scanner as in claim 2 wherein a feed roller is stopped on detection of short documents to prevent jams.

4. The document scanner in claim 1 wherein said capture device is a linear sensor.

5. The document scanner as in claim 1 wherein the at least one characteristic related to document condition or content is notes or labels adhered to a document.

6. The document scanner of claim 1, wherein the at least one characteristic related to document condition or content is at least one of document length, document width, document position, document orientation, color, and defects.

7. The document scanner of claim 1, wherein the at least one characteristic related to document condition or content is a position of the edges of a document, and wherein ultrasonic zones determined to be at least partially covered by the edges of the document are disabled or ignored.

* * * * *